(12) United States Patent
Lang et al.

(10) Patent No.: US 7,290,797 B2
(45) Date of Patent: Nov. 6, 2007

(54) CENTER DISCHARGE HYBRID INFLATOR DEVICE

(75) Inventors: Gregory J. Lang, South Ogden, UT (US); William D. Staheli, North Ogden, UT (US); Robert E. Lewis, West Haven, UT (US); Steve Taylor, Sunset, UT (US)

(73) Assignee: Autoliv ASP, Inc., Ogden, UT (US)

( * ) Notice: Subject to any disclaimer, the term of this patent is extended or adjusted under 35 U.S.C. 154(b) by 445 days.

(21) Appl. No.: 10/977,638

(22) Filed: Oct. 29, 2004

(65) Prior Publication Data

US 2006/0091660 A1    May 4, 2006

(51) Int. Cl.
*B60R 21/26* (2006.01)
(52) U.S. Cl. ...................... 280/741; 280/737
(58) Field of Classification Search .......... 280/737, 280/741, 736; 102/530, 531
See application file for complete search history.

(56) References Cited

U.S. PATENT DOCUMENTS

| | | | | |
|---|---|---|---|---|
| 3,721,456 A | * | 3/1973 | McDonald | ............... 280/736 |
| 4,796,912 A | | 1/1989 | Lauritzen et al. | |
| 5,290,060 A | | 3/1994 | Smith | |
| 5,456,492 A | | 10/1995 | Smith et al. | |
| 5,608,183 A | | 3/1997 | Barnes et al. | |
| 5,630,619 A | | 5/1997 | Buchanan et al. | |
| 5,794,973 A | | 8/1998 | O'Loughlin et al. | |
| 6,010,153 A | | 1/2000 | Halas et al. | |
| 6,019,389 A | * | 2/2000 | Burgi et al. | ............... 280/736 |
| 6,095,556 A | * | 8/2000 | Bailey et al. | ............... 280/737 |
| 6,103,030 A | | 8/2000 | Taylor et al. | |
| 6,170,867 B1 | * | 1/2001 | Rink et al. | ............... 280/736 |
| 6,189,922 B1 | * | 2/2001 | Parks et al. | ............... 280/735 |
| 6,253,683 B1 | * | 7/2001 | Fukabori | ................ 102/530 |
| 6,382,668 B1 | | 5/2002 | Goetz | |
| 6,488,310 B1 | * | 12/2002 | Ryobo et al. | ............... 280/736 |
| 6,976,704 B2 | * | 12/2005 | Lewis et al. | ............... 280/741 |
| 2003/0057689 A1 | | 3/2003 | Katsuda et al. | |
| 2005/0029785 A1 | * | 2/2005 | Bilbrey et al. | ............... 280/736 |
| 2005/0189750 A1 | * | 9/2005 | Gotoh et al. | ............... 280/737 |

FOREIGN PATENT DOCUMENTS

| | | |
|---|---|---|
| DE | 197 53 811 A1 | 6/1998 |
| EP | 0 602 862 A1 | 6/1994 |

* cited by examiner

*Primary Examiner*—Ruth Ilan
(74) *Attorney, Agent, or Firm*—Sally J Brown; Pauley Petersen & Erickson

(57) ABSTRACT

An inflator device for an inflatable restraint system. The inflator device includes a tubular body with a center discharge opening disposed in a center portion of reduced diameter. First and second end closures each join an initiator to a respective opposing end of the tubular body to define a sealed chamber. First and second generant housings are disposed within the sealed chamber, define generant chambers containing a supply of generant material and include a plurality of openings providing fluid communication between the generant chambers and the sealed chamber. Rupturable initiator seals are disposed between the initiators and a respective generant chamber. A supply of pressurized stored gas and the supply of generant material are disposed within the sealed chamber.

9 Claims, 1 Drawing Sheet

CENTER DISCHARGE HYBRID INFLATOR DEVICE

BACKGROUND OF THE INVENTION

This invention relates generally to an inflator device for inflating an inflatable cushion of an inflatable vehicle restraint system and, more particularly, to a hybrid inflator device such as for use in such inflatable vehicle restraint systems.

It is well known to protect a vehicle occupant using a cushion or bag, e.g., an "airbag cushion," that is inflated or expanded with gas such as when the vehicle encounters sudden deceleration, such as in the event of a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as an "inflator."

Various types of airbag inflator devices have been disclosed in the art for the inflation of airbag cushions such as used in inflatable restraint systems. One such inflator device, generally known as a hybrid airbag inflator, uses high temperature reaction products, typically also including additional gas products, generated by the reaction of a reactive material, to increase the gas pressure within the inflator, rupturing a rupturable seal and inflating one or more airbag cushions. In some cases, the stored and pressurized gas may include or form an oxidizing gas to assist in more fully converting the reaction products generated by the reaction of the reactive material, to compounds such as carbon dioxide and water.

Often such inflator devices also include an initiator, such as a squib, and an igniter composition to actuate the reactive material. In practice, upon receipt of an appropriate triggering signal from a crash or deceleration sensor, the initiator activates causing the rapid combustion of the igniter composition, which in turn actuates the reactive material. The igniter composition may be incorporated in the initiator in various forms such as a granular material.

The size, shape, and components of airbag inflators can vary depending on the vehicle and where in the vehicle the airbag inflator is used, e.g., driver side or passenger side. In addition, the size of the reactive material load contained within such an inflator structure is generally predetermined in order to be sufficient to result in desired inflation of the associated airbag cushion upon actuation of the inflator. As will be appreciated, the incorporation and use of a different sized inflator are often necessary to change or alter the inflation performance provided by the inflator system. Consequently, significant design changes may be required to permit the incorporation and use of such inflator system between applications requiring or desiring different inflation performances.

In view of possibly varying operating conditions and, in turn, possibly varying desired performance characteristics, there is a need and a desire to provide what has been termed an "adaptive" airbag inflator device and a corresponding inflatable restraint system. With an adaptive inflator, output parameters such as one or more of the quantity, supply and rate of production of inflation gas, for example, can be selectively and appropriately varied dependent on selected operating conditions such as ambient temperature, occupant presence or position, seat belt usage and rate of deceleration of the motor vehicle, for example.

Safety restraint airbag cushions are normally sized and shaped to provide a vehicle occupant with desired cushioning protection when such an airbag cushion has been properly deployed. In a typical airbag module assembly, an airbag cushion is normally stored within a reaction canister in an uninflated, folded condition. In practice, an airbag cushion for the protection of a front seat passenger in the event of a vehicular frontal impact is typically of a substantially larger size, e.g., larger volume, than a corresponding airbag cushion for the protection of the vehicle driver. Consequently, an inflator device associated with the inflation of a passenger airbag cushion must typically provide a substantially greater relative volume or amount of inflation gas in a timely and effective manner. However, passenger occupants typically do not maintain a relatively standard traveling position as do vehicle drivers. Due to the variations in passenger positions, it can be desirable that the passenger side airbag deploys at a slower initial rate followed by a subsequent increase in deployment rate. Therefore, the chance of injury due to an out-of-position occupant is decreased. This type of variation in deployment can be obtained through controlled inflation gas output, generally referred to as adaptive inflation gas output.

While such adaptive systems are desirable, they typically require the inclusion of additional components as a part of the associated inflator device. As will be appreciated, the inclusion of such additional components may undesirably increase one or more of the size, cost and weight of the inflator device. In view thereof, it has been difficult to provide an adaptive inflator, and particularly an adaptive hybrid inflator, which will satisfactorily meet the size, cost and weight limitations associated with modern vehicle design, particularly as it pertains to passenger side applications.

Thus, there is a need and a demand for an adaptive inflator device, and more particularly an adaptive hybrid inflator, of relatively simple and lightweight design and construction and, in turn, comparatively, low or reduced cost. In particular, there is a need and a demand for such an adaptive inflator device which will meet the differing output requirements between various vehicles with a single design.

SUMMARY OF THE INVENTION

A general object of the invention is to provide an improved vehicular inflatable restraint system inflator device.

A more specific objective of the invention is to overcome one or more of the problems described above.

The general object of the invention can be attained, at least in part, through improvement of an inflator device for inflating an inflatable cushion in an inflatable restraint system. The inflator device includes a supply of generant material that is reactable to at least produce heat and inflation gas. An initiator is in reaction initiating communication with the supply of generant material and a sealed chamber contains a supply of pressurized stored gas. The improvement includes the supply of generant material being disposed within the sealed chamber, the initiator disposed outside of the sealed chamber, and a rupturable initiator seal disposed between the initiator and the supply of generant material.

In contrast with the present invention, the prior art generally fails to disclose an adaptive airbag inflator or adaptive hybrid airbag inflator that is as easy and inexpensive to manufacture and as lightweight as may be desired.

The invention further comprehends an inflator device for an inflatable restraint system. The inflator device includes a substantially cylindrical housing defining a chamber. The housing includes a tubular body with a center portion of reduced diameter and a center discharge opening disposed in the center portion of reduced diameter. The housing also includes a first end closure at a first end of the tubular body and a second end closure at a second end of the tubular body opposite the first end. At least one of the first and second end closures secures an initiator. The chamber is a sealed chamber including a supply of pressurized stored gas. A supply of generant material is also disposed within the sealed chamber and in contact with the supply of pressurized stored gas. A diffuser is connected to the tubular body portion of reduced diameter in discharge communication with the center discharge opening.

The invention still further comprehends another inflator device for an inflatable restraint system. The inflator device includes a tubular body with a first end, a second end opposite the first end, a center portion of reduced diameter, and a center discharge opening disposed in the center portion of reduced diameter. A first end closure securing a first initiator is joined to the first end of the tubular body. A second end closure securing a second initiator is joined to the second end of the tubular body. The tubular body and the first and second end closures define a sealed chamber. A first generant housing is disposed within the sealed chamber and defines a first generant chamber. The first generant housing includes a first perforated tube connected at an open end to the first end closure and including a plurality of openings providing fluid communication between the first generant chamber and the sealed chamber. The first generant housing also includes an end wall at an end of first generant chamber opposite the open end. A second generant housing is also disposed within the sealed chamber and defines a second generant chamber. The second generant housing includes a second perforated tube connected at an open end to the second end closure and including a plurality of openings providing fluid communication between the second generant chamber and the sealed chamber. The second generant housing also includes an end wall at an end of second generant chamber opposite the open end. A first rupturable initiator seal is disposed between the first initiator and the first generant chamber. A second rupturable initiator seal is disposed between the second initiator and the second generant chamber. A rupturable outlet seal is disposed over the center discharge opening and a supply of pressurized stored gas disposed within the sealed chamber. A first supply of generant material is disposed within the first generant chamber and a second supply of generant material is disposed within the second generant chamber.

As used herein, references to a "center portion" of a tubular body or housing of the inflator device, particularly when referring to a "center portion of reduced diameter," are to be understood to refer to an intermediate or middle portion of the tubular body or housing desirably, but not necessarily, at or over an exact midpoint of the tubular body or housing.

References herein to "discharge communication" are to be understood to refer to the positioning of one element, opening or passageway with another element, opening or passageway, whereby gas, or another reaction product, traveling through the one element, opening or passageway is directed to and through the other element, opening or passageway.

Further, references to "reaction initiating communication" are to be understood to refer to a relationship between two elements or materials, whereby one element or material is able to initiate reaction of the other element or material.

Other objects and advantages will be apparent to those skilled in the art from the following detailed description taken in conjunction with the appended claims and drawings.

DETAILED DESCRIPTION OF THE INVENTION

The present invention provides an improved hybrid inflator device that discharges inflation gas through a central diffuser element. The inflator device includes pressurized stored gas within a sealed chamber until a predetermined internal pressure has been obtained. One or more pyrotechnic initiators are disposed outside the sealed chamber in reaction initiating communication with one or more supplies of generant material, e.g., a material that reacts to produce heat and/or gas, contained within the sealed chamber. The inflator device of this invention incorporates a relatively low cost, lightweight design for use in inflatable vehicle restraint systems such as either a passenger side or driver side inflatable vehicle restraint system, for example. By storing the generant material within the pressurized stored gas-containing sealed chamber, the inflator device provides improved reaction initiation of the generant material, thereby providing improved inflation gas production and reducing or eliminating the need for known secondary ignition systems.

Figure 1:
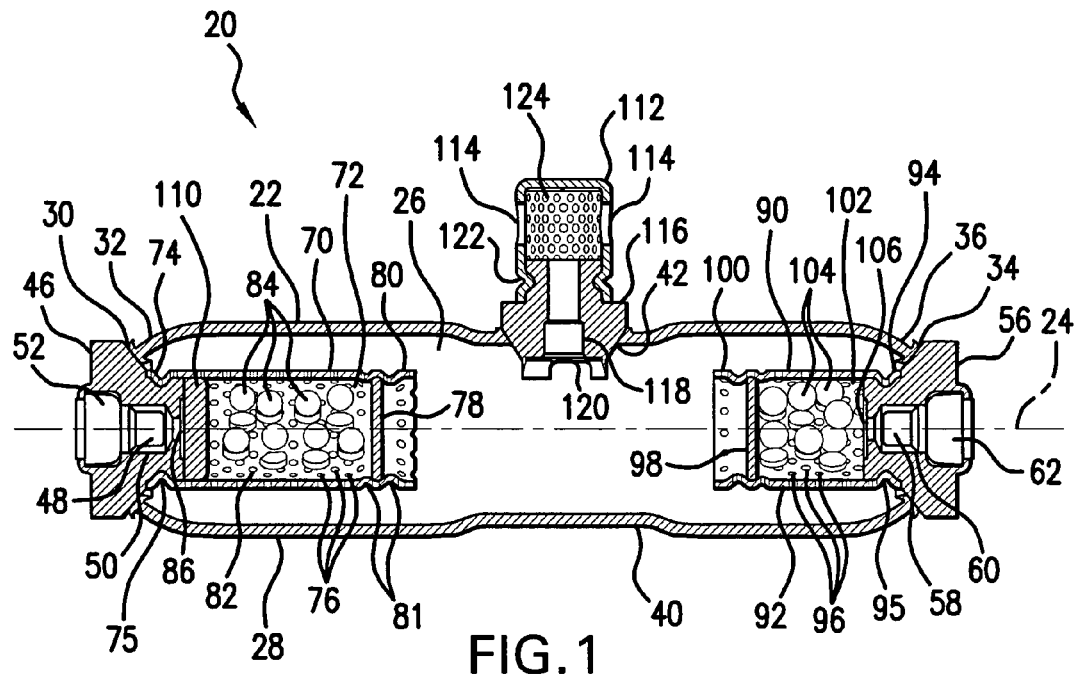
FIG. 1 is a partial sectional view of an inflator device according to one embodiment of the invention.

FIG. 1 shows an inflator device 20 according to one embodiment of the invention. The configuration of the inflator device 20 is generally desirably for use in passenger side inflatable restraint systems. The inflator device 20 includes a substantially cylindrical housing 22 having a longitudinal axis 24 and defining a chamber 26. The housing 22 includes a tubular body 28 having a first opening 30 at a first end 32 and a second opening 34 at a second end 36, which is opposite the first end 32.

The tubular body 28 includes a center portion of reduced diameter 40. As illustrated in FIG. 1, the center portion of reduced diameter 40 is not necessarily disposed exactly centered between, i.e., equidistant from, the first end 32 and the second end 36. As defined above, references herein to a "center portion" of a tubular body or housing of the inflator device, particularly when referring to a "center portion of reduced diameter," are to be understood to refer to an intermediate or middle portion of the tubular body or housing desirably, but not necessarily, centered at an exact midpoint of the tubular body or housing. The tubular housing 28 also includes a center discharge opening 42 disposed in the center portion of reduced diameter 40. As will be discussed in more detail below, the center portion of reduced diameter 40 is desirably positioned to dispose the center discharge opening 42 equidistantly between two housings containing generant material, and the center discharge opening 42 is desirably sealed when the inflator device 20 is in a static state before actuation of the inflator device 20 to provide inflation gas for inflating an associated inflatable cushion (not shown).

The inflator device 20 includes a first end closure 46 that is joined, such as, for example, by welding, to the first end 32 of the tubular housing 28. The first end closure 46 desirably fills or covers the first opening 30 to seal the housing 22 and the chamber 26 at the tubular housing first end 32. As will be appreciated by one skilled in the art and guided by the teachings herein provided, the first end closure 46 can include any suitable size, shape and material of construction, such as metal, depending upon the desired configuration of the tubular housing 22 and/or the inflator device 20.

The first end closure 46 secures a first initiator 48. Preferably, the first initiator 48 is secured within a passage 50 of the first end closure 46 and coaxially positioned with the first end closure 46 about the longitudinal axis 24 as shown in FIG. 1. The first initiator 48 is generally designed to provide or produce an ignition discharge upon receipt of an electric signal. As will be appreciated by one skilled in the art following the teachings herein provided, various and alternative initiator, designs or configurations known in the art for activating a supply of generant material upon receiving an electric signal are available for use as the first initiator 48. The first initiator 48 generally or typically contains a reactive charge (not shown) in reaction initiating communication with at least one electrical connector (not shown). The first initiator 48 includes an optional molded portion 52, such as, for example, formed of a thermoplastic material.

The inflator device 20 includes a second end closure 56 joined to the second end 36 of the tubular housing 28. The second end closure 56 desirably fills or covers the second opening 34 to seal the housing 22 and the chamber 26 at the tubular housing second end 36. The second end closure 56 can be identical to or different from the first end closure 46. In the embodiment of the invention shown in FIG. 1, the second end closure 56 is generally identical to the first end closure 46. The second end closure 56 secures a second initiator 58 within a passage 60 of the second end closure 56. The second initiator 58 is coaxially positioned with the second end closure 56 about the longitudinal axis 24 and facing toward the first initiator 48. The second initiator 58 also includes a molded portion 62, such as, for example, formed of a thermoplastic material.

The first end closure 46 and the second end closure 56 seal the first end 32 and the second end 36 of the tubular body 28, respectively, to form a sealed chamber 26. The sealed chamber 26 contains a supply of pressurized stored gas, such as, for example, oxygen, argon, helium, nitrous oxide ($N_2O$) and combinations thereof. As discussed further below, the inflator device 20 also includes a supply of generant material within the pressurized stored gas-containing sealed chamber 26. Various and alternative generant materials and pressurized gases known in the art for producing inflation gas in an inflator device are available for use in the inflator device of the present invention.

A first generant housing 70 is disposed within the pressurized stored gas-containing sealed chamber 26. In one embodiment of the invention, as shown in FIG. 1, the first generant housing 70 includes a first perforated tube 72. The first perforated tube is connected at an open end 74 to the first end closure 46. The first perforated tube 72 includes a plurality of perforations or openings 76. In the embodiment shown in FIG. 1, the perforated tube 72 is joined to the first end closure 46 by a crimp 75. In one embodiment of the invention, the perforated tube 72 is desirably formed of a rolled sheet of perforated metal with two abutting side edges being welded together. As will be appreciated by one skilled in the art following the teachings herein provided, forming a generant housing from a perforated tube formed of a lightweight metal provides a relative easy to assembly, low cost and lightweight generant housing.

The generant housing 70 includes an end wall 78 disposed toward and closing a second end 80 of the perforated tube 72 opposite the open end 74. The end wall 78 is joined to the perforated tube 72 by crimps 81. The generant housing 70 defines a first generant chamber 82 containing a first supply of generant material 84. As discussed above, in the inflator device of the present invention, the generant material is contained within the pressurized stored gas-containing sealed chamber with the pressurized stored gas. In one embodiment of the invention, as shown in FIG. 1, the inflator device 20 includes a first rupturable initiator seal 86 disposed between the first initiator 48 and each of the first generant chamber 82, the pressurized stored gas-containing sealed chamber 26, and the first supply of generant material 84. In other words, the first supply of generant material 84 is within the pressurized stored gas-containing sealed chamber 26 and the first initiator 48 is outside of the pressurized stored gas-containing sealed chamber 26. The first rupturable initiator seal 86 also retains the pressurized stored gas within the pressurized stored gas-containing sealed chamber 26. The first rupturable initiator seal 86 desirably is formed of a thin material, such as, for example, a metal foil disk, attached to the first end closure 46 over the passage 50.

The first supply of generant material 84 within the pressurized stored gas-containing sealed chamber 26 is in contact with the pressurized stored gas by the plurality of openings 76 which provide fluid communication between the first generant chamber 82 and the pressurized stored gas-containing sealed chamber 26. Positioning generant material within the pressurized stored gas-containing sealed chamber beneficially provides a lower pressure differential across the reaction chambers, thereby resulting in a relatively less complicated, lighter and lower cost design. In addition, it has been discovered that storing generant material under pressure generally improves the reaction ignition properties of the generant material. In one embodiment of the invention, the reacting generant material provides improved heat and/or gas yields while desirably producing less undesirable reaction byproducts. The improved reaction ignition properties of the generant material generally reduces or eliminates the need for a secondary reaction initiation material. The improved ignition generally improves the overall reaction properties and gas production of the inflator device.

The inflator device 20 also includes a second generant housing 90 disposed within the pressurized stored gas-containing sealed chamber 26. The second generant housing 90 includes a second perforated tube 92 connected at an open end 94 to the second end closure 56 by a crimp 95. The perforated tube 92 includes a plurality of openings 96. The second generant housing 90 includes an end wall 98 disposed toward a second end 100 of the perforated tube 92 opposite the open end 94. The end wall 98 closes off the second generant housing 90 to define a second generant chamber 102 containing a second supply of generant material 104. The second supply of generant material 104 can include a same or different type, form and/or amount of generant material than the first supply of generant material 84. As discussed above, various and alternative types and forms of generant materials are available for use in the inflator device of the invention, such as, for example, a gas generant composition such as disclosed in commonly assigned Taylor et al., U.S. Pat. No. 6,103,030, issued 15 Aug. 2000 and such as containing guanidine nitrate, copper diammine dinitrate and silicon dioxide, and such as disclosed in commonly assigned Barnes et al., U.S. Pat. No. 5,608,183, issued 4 Mar. 1997 and such as containing basic copper nitrate, guanidine nitrate, aluminum oxide and silicon dioxide.

The second supply of generant material 104 is also contained within the pressurized stored gas-containing sealed chamber 26. A second rupturable initiator seal 106 is disposed between the second initiator 58 and the second generant chamber 102. Similar to the first rupturable initiator seal 86, the second rupturable initiator seal 106 desirably is formed of a thin material, such as, for example, a metal foil disk, attached to the second end closure 56 over an open end of the passage 60. The second supply of generant material 104 within the pressurized stored gas-containing sealed chamber 26 is also in contact with the pressurized stored gas by the plurality of openings 96, which provide fluid communication between the second generant chamber 102 and the pressurized stored gas-containing sealed chamber 26.

The inflator device 20 shown in FIG. 1 is an adaptive hybrid inflator device. The inflator device 20 is a "hybrid" inflator device in that it incorporates and/or utilizes both pressurized stored gas and a supply of generant material for providing inflation gas to inflate an associated inflatable cushion (not shown) of an inflatable restraint system. The inflator device 20 is an "adaptive" inflator device in that the inflator device 20 incorporates two separately actuating initiators 48 and 58 in reaction initiating communication with a supply of generant, and more particularly two individual and separate supplies of generant material 84 and 104, respectively. With an adaptive inflator, output parameters such as one or more of the quantity, supply and rate of production of inflation gas, for example, can be selectively and appropriately varied dependent on selected operating conditions such as ambient temperature, occupant presence or position, seat belt usage and rate of deceleration of the motor vehicle, for example.

As discussed above, the first and second initiators 48 and 58 each contain a reactive charge which is actuated by an electrical signal sent, for example, upon a vehicle crash or roll over. Upon receiving an appropriate electric signal, one or both (simultaneously or sequentially) of the reactive charges react to each produce an ignition discharge which ruptures and discharges from the first and second initiators 48 and 58, respectively. The ignition discharges further rupture the first and second rupturable initiator seals 86 and 106, respectively, to contact the first and second supplies of generant material 84 and 104, respectively. The ignition discharges initiate reaction of the generant materials 84 and 104, respectively, to produce heat and/or gas, and desirably both heat and gas. As shown in FIG. 1, the first generant chamber 82 includes an optional booster material 110, such as, for example, titanium hydride potassium perchlorate (THPP). As will be appreciated by one skilled in the art following the teachings herein provided, the booster material 110 may be incorporated in particular embodiments of the invention to rapidly increase pressure within the pressurized stored gas-containing sealed chamber 26, such as, for example, to desirably decrease cold first stage only ("FSO") time to first gas ("TTFG").

In one embodiment of the invention, the first and second supplies of generant material 84 and 104, upon reaction initiation, react to produce heat, gas and a residue material. The residue material includes one or more reaction byproducts produced by the reacting generant materials 84 and 104. The heat from the reacting generant materials 84 and 104 acts to increase the internal pressure within the pressurized stored gas-containing sealed chamber 26. In addition, the produced gas adds to the internal pressure within the pressurized stored gas-containing sealed chamber 26, as the produced gas can readily discharge from the generant chambers 82 and 102, respectively, into the remaining portion of the pressurized stored gas-containing sealed chamber 26 through the plurality of openings 76 and 96, respectively. The perforated tubes 72 and 92 also desirably and beneficially act as a filter for the produced gas by allowing the produced gas to flow through the openings 76 and 96 while retaining at least a portion of the residue material within the generant chambers 82 and 102, respectively. Desirably, a majority portion of the residue material collects on or is retained by the inner surface of the perforated tubes 72 and 92. As will be appreciated by one skilled in the art following the teachings herein provided, various and alternative sizes, shapes, and configurations are available for the generant housing(s), perforated tube(s) and/or the openings therein of the inflator device of the invention. As will also be appreciated, the filtering properties of a generant housing and/or a perforated tube can be modified or adjusted depending on need, by, for example, adjusting the size, spacing and/or amount of the openings therein. In one embodiment of the invention, the openings in the generant housing and/or perforated tube provide a combined open flow area of about 25% to about 40% of the area of the generant housing and/or perforated tube. The openings in one embodiment of the invention desirably have a diameter of about 1.0 to about 2.0 mm.

As discussed above, the center discharge opening 42 is desirably sealed when the inflator device 20 is in a static state before actuation. In one embodiment of the invention, shown in FIG. 1, a diffuser 112 desirably is disposed in discharge communication with the center discharge opening 42. The diffuser 112 includes more than one diffuser openings 114 appropriately spaced, such as on opposing sides as shown in FIG. 1, to uniformly diffuse discharging inflation gas to provide a thrust neutral inflator device 20. In the embodiment of the invention shown in FIG. 1, the diffuser 112 is connected to the tubular body portion of reduced diameter 40 by a nozzle 116 which is welded to the tubular body 28. The portion of reduced diameter 40 desirably reduces stress in the area of the attached nozzle 116, thereby avoiding, reducing or minimizing the possibility of unintended rupture of the welded seal between the nozzle 116 and the tubular body 28.

The nozzle 116 includes a generally central nozzle passage 118 in discharge communication with the center discharge opening 42 and extending between the center discharge opening 42 and the diffuser 112. A rupturable outlet seal 120 seals the center discharge opening 42. In the embodiment shown in FIG. 1, the diffuser 112 is joined to the nozzle 116 by a crimp 122 and the rupturable outlet seal 120 is attached to the nozzle 116 to seal the nozzle passage 118. A screen 124 is disposed within the diffuser 112. The screen 124 can act to filter or remove undesirable pieces or fragments of the ruptured outlet seal 120 from the discharging inflation gas. As will be appreciated by one skilled in the art following the teachings herein provided, various and alternative sizes, shapes and configurations are available for the nozzle 116, outlet seal 120, the diffuser 112, the diffuser openings 114 and the screen 124.

Upon actuation of one or both of the initiators 48 and 58, the heat and/or gas produced by the reacting generant materials 84 and 104, in combination with the pressurized stored gas already in the pressurized stored gas-containing sealed chamber 26, increases the internal pressure of the pressurized stored gas-containing sealed chamber 26. The gas pressure within the pressurized stored gas-containing sealed chamber sealed chamber 26 ruptures the rupturable outlet seal 120, thereby allowing the pressurized stored gas and the gas produced by the reacting generant material to pass through the nozzle passage 116 and the screen 124 to discharge from the diffuser 112 as inflation gas through the diffuser openings 114.

The first and second initiators 48 and 58 of the adaptive inflator device 20 can be actuated simultaneously or in sequence at a predetermined time interval. Alternatively, only one of the first and second initiators 48 and 58 can be actuated without actuation of the other. As will be appreciated by one skilled in the art following the teachings herein provided, output parameters such as one or more of the quantity, supply and rate of production of inflation gas, for example, can be selectively and appropriately varied by various and alternative initiator actuation and/or actuation sequences. In one particularly preferred embodiment of the invention, the first initiator 48 is actuated by a first electric signal at a predetermined time interval before the second initiator 58. Upon actuation, the first initiator 48 produces an ignition discharge that ruptures the first initiator seal 86 and initiates reaction of the booster 110. The booster 110 reacts to desirably produce heat and/or gas to generally rapidly increase the pressure within the pressurized stored gas-containing sealed chamber 26 and also acts with the ignition discharge to initiate reaction of the first supply of generant material 84. The first supply of generant material 84 reacts to produce heat and/or gas, which is released into the chamber 26 through the openings 76. The increase in pressure within the pressurized stored gas-containing sealed chamber 26 ruptures the outlet seal 120 and inflation gas ultimately discharges through the diffuser openings 114 into an associated inflatable cushion (not shown). The second initiator 58 is actuated by a second electric signal at a predetermined time interval after the first initiator 48. The second initiator 58 may be actuated before or after the outlet seal 120 ruptures. The second initiator 58 produces an ignition discharge that ruptures the second initiator seal 106 and initiates reaction of the second supply of generant material 104. The second supply of generant material 104 reacts to produce additional heat and/or gas. The produced gas discharges from the chamber 26 through the diffuser openings 114.

Thus the inflator device 20 is capable of providing an adaptive output of inflation gas with a first initial stage of inflation gas production provided by the actuation of the first initiator 48 before the second stage of inflation gas production by the subsequent actuation of the second initiator 58. In one embodiment of the invention, the amount of inflation gas produced by the second stage of gas production is desirably less than the amount of gas produced in the first stage of gas production. As shown in FIG. 1, the second perforated tube 92 has a length that is less than a length of the first perforated tube 72. The second perforated tube 92 also contains a lesser amount of generant material than the first perforated tube 72. As will be appreciated by one skilled in the art following the teachings herein provided, the tubular body center portion of reduced diameter 40 and the center discharge opening 42 are positioned off from the exact center on the tubular body 28 so that the center discharge opening 42 is disposed approximately or substantially equidistantly between the ends of the differently sized first and second perforated tubes 72 and 92.

Figure 2:
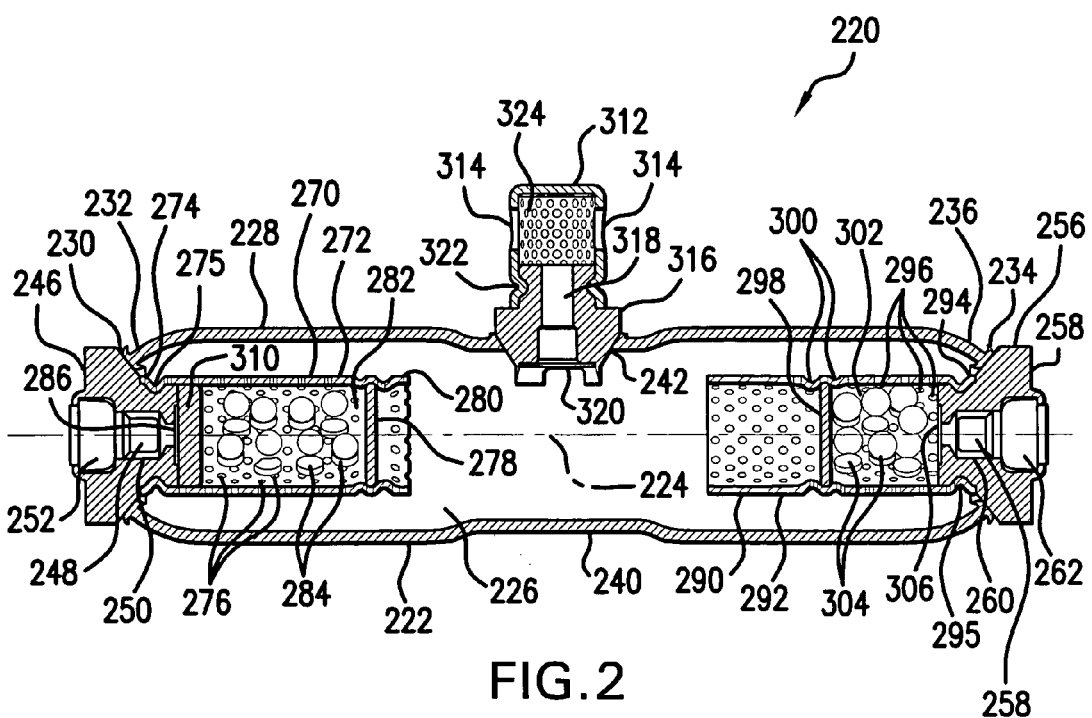
FIG. 2 is a partial sectional view of an inflator device according to another embodiment of the invention.

FIG. 2 is an inflator device 220 according to another embodiment of the invention. The configuration of the inflator device 220 is also generally desirably for use in passenger side inflatable restraint systems. The inflator device 220 includes a substantially cylindrical housing 222 having a longitudinal axis 224 and defining a chamber 226. The housing 222 includes a tubular body 228 having a first opening 230 at a first end 232 and a second opening 234 at a second end 236, which is opposite the first end 232.

The tubular body 228 includes a center portion of reduced diameter 240. In contrast to the inflator device of FIG. 1, the center portion of reduced diameter 240 is generally centered between, i.e., substantially equidistant from, the first end 232 and the second end 236. The tubular housing 228 includes a center discharge opening 242 disposed in the center portion of reduced diameter 240. The center discharge opening 242 is desirably sealed when the inflator device 220 is in a static state before actuation.

The inflator device 220 includes a first end closure 246 joined to the first end 232 of the tubular housing 228. The first end closure 246 desirably fills or covers the first opening 230 to seal the housing 222 and the chamber 226 at the tubular housing first end 232. As will be appreciated by one skilled in the art and guided by the teachings herein provided, the first end closure 246 can include any suitable size, shape and materials of construction, such as metal, depending upon the desired configuration of the tubular housing 222 and/or the inflator device 220. The first end closure 246 secures a first initiator 248. The first initiator 248 is desirably secured within a passage 250 of the first end closure 246 and coaxially positioned with the first end closure 246 about the longitudinal axis 224. The first initiator 248 is generally designed to provide or produce an ignition discharge upon receipt of an electric signal. As will be appreciated by one skilled in the art following the teachings herein provided, various and alternative initiator designs or configurations known in the art for activating a supply of generant material upon receiving an electric signal are available for use as the first initiator 248. The first initiator 248 generally or typically contains a reactive charge (not shown) in reaction initiating communication with at least one electrical connector (not shown). The first initiator 248 includes an optional molded portion 252, such as, for example, formed of a thermoplastic material.

The inflator device 220 includes a second end closure 256 joined to the second end 236 of the tubular housing 228. The second end closure 256 desirably fills or covers the second opening 234 to seal the housing 222 and the chamber 226 at the tubular housing second end 233. The second end closure 256 can be identical to or different from the first end closure 246. In the embodiment of the invention shown in FIG. 2, the second end closure 256 is generally identical to the first end closure 246. The second end closure 256 secures a second initiator 258 within a passage 260 of the second end closure 256. The second initiator 258 is coaxially positioned with the second end closure 256 about the longitudinal axis 224 and facing toward the first initiator 248. The second initiator 258 also includes a molded portion 262, such as, for example, formed of a thermoplastic material.

The first end closure 246 and the second end closure 256 seal the first end 232 and the second end 236 of the tubular body 228, respectively, to form a sealed chamber 226. The sealed chamber 226 contains a supply of pressurized stored gas. As discussed further below, the inflator device 220 also includes a supply of generant material within the pressurized stored gas-containing sealed chamber 226. As shown in FIG. 2, a first generant housing 270 is disposed within the pressurized stored gas-containing sealed chamber 226. The first generant housing 270 includes a first perforated tube 272 connected at an open end 274 to the first end closure 246 by a crimp 275. The first perforated tube includes a plurality of perforations or openings 276. The generant housing 270 also includes an end wall 278 disposed toward and closing a second end 280 of the perforated tube 272 opposite the open end 274. The generant housing 270 defines a first generant chamber 282 containing a first supply of generant material 284. As discussed above, in the inflator device of the present invention, the supply of generant material is contained within the sealed chamber with the pressurized stored gas. The inflator device 220 includes a first rupturable initiator seal 286 disposed between the first initiator 248 and the first generant chamber 282 to seal the pressurized stored gas and the first supply of generant material 284 within the chamber 226. The first rupturable initiator seal 286 is desirably formed of a thin material, such as, for example, a metal foil disk, attached to the first end closure 246 over the passage 250. The first supply of generant material 284 within the pressurized stored gas-containing sealed chamber 226 is in contact with the pressurized stored gas by the plurality of openings 276 which provide fluid communication between the first generant chamber 282 and the pressurized stored gas-containing sealed chamber 226.

The inflator device 220 also includes a second generant housing 290 disposed within the pressurized stored gas-containing sealed chamber 226. The second generant housing 290 includes a second perforated tube 292 connected at an open end 294 to the second end closure 256 by a crimp 295. The second perforated tube includes a plurality of perforations or openings 296. In the embodiment shown in FIG. 2, the second perforated tube 292 is the same length of the first perforated tube 272 but an end wall 298 is disposed at about a midpoint of the second perforated tube 292 by crimps 300. The end wall 298 closes off a portion of the second generant housing 290 to define a second generant chamber 302 containing a second supply of generant material 304. The second generant chamber 302 is smaller than the first generant chamber 282 and the second supply of generant material 304 includes a lesser amount of generant material than the first supply of generant material 284. As will be appreciated by one skilled in the art following the teachings herein provided, incorporating two perforated tubes of the same size and forming the two differently sized generant housings by different positions of the end wall promotes manufacturing and cost efficiency, particularly as only one size of perforated tube needs to be produced.

The second supply of generant material 304 is also contained within the pressurized stored gas-containing sealed chamber 226 with the pressurized stored gas. A second rupturable initiator seal 306 is disposed between the second initiator 258 and the second generant chamber 302. Similar to the first rupturable initiator seal 286, the second rupturable initiator seal 306 desirably is formed of a thin material, such as, for example, a metal foil disk, attached to the first end closure 246 over an open end of the passage 260. The second supply of generant material 304 within the pressurized stored gas-containing sealed chamber 226 is in contact with the pressurized stored gas by the plurality of openings 296 which provide fluid communication between the second generant chamber 302 and the pressurized stored gas-containing sealed chamber 226.

The inflator device 220 shown in FIG. 2 is an adaptive hybrid inflator device. As discussed above, the first and second initiators 248 and 258 each contain a reactive charge which is actuated by an electric signal sent, for example, by a sensor system upon a vehicle crash or roll over. Upon receiving the appropriate electric signal, one or both of the reactive charges simultaneously or sequentially react to produce ignition discharges which rupture and discharge from the first and second initiators 248 and 258. The ignition discharges further rupture the first and second rupturable initiator seals 286 and 306, respectively, to contact the first and second supplies of generant material 284 and 304, respectively. The ignition discharges initiate reaction of the generant materials 284 and 304 to produce at least heat or gas, and desirably both heat and gas. As shown in FIG. 2, the first generant chamber 282 includes an optional booster material 310 that is capable of quickly reacting to rapidly increase pressure within the pressurized stored gas-containing sealed chamber 226.

The first and second supplies of generant material 284 and 304, upon reaction initiation, desirably react to produce heat, gas and a reaction byproduct residue material. The heat from the reacting generant materials 284 and 304 acts to increase the internal pressure within the pressurized stored gas-containing sealed chamber 226. In addition, the produced gas adds to the internal pressure within the pressurized stored gas-containing sealed chamber 226, as the produced gas can exit the generant chambers 282 and 302, respectively, into the remaining portion of the pressurized stored gas-containing sealed chamber 226 through the plurality of openings 276 and 296, respectively. The perforated tubes 272 and 292 also desirably and beneficially act as a filter for the produced gas by allowing the produced gas to flow through the openings 276 and 296 while retaining at least a portion of the residue material within the generant chambers 282 and 302, respectively. Desirably, the openings 276 and 296 are configured as described above for openings 76 and 96 shown in FIG. 1, such that a portion, and desirably a majority, of the residue material collects on or is retained by the inner surface of the perforated tubes 272 and 292.

As discussed above, the center discharge opening 242 is desirably sealed when the inflator device 220 is in a static state before actuation. In FIG. 2, a diffuser 312 is disposed in discharge communication with the center discharge opening 242. The diffuser 312 desirably includes more than one diffuser openings 314 appropriately spaced, such as on opposing sides as shown in FIG. 2, to uniformly diffuse the discharge of inflation gas to provide a thrust neutral inflator device 220. In the embodiment of the invention shown in FIG. 2, the diffuser 312 is connected to the tubular body portion of reduced diameter 240 through a nozzle 316 that is welded to the tubular body portion of reduced diameter 240. The nozzle 316 includes a generally central nozzle passage 318 in discharge communication with the center discharge opening 242 and extending between the center discharge opening 242 and the diffuser 312. A rupturable outlet seal 320, such as composed of a burst disk, seals the nozzle passage 318, and thus the center discharge opening 242. The diffuser 312 is joined to the nozzle 316 by a crimp 322 and the rupturable outlet seal 320 is attached to the nozzle 316 to seal the nozzle passage 318. A screen 324 is disposed within the diffuser 312 such as to desirably filter or remove pieces or fragments resulting from the ruptured outlet seal 320 from the discharging inflation gas. As will be appreciated by one skilled in the art following the teachings herein provided, various and alternative sizes, shapes and configurations are available for the nozzle 316, outlet seal 320, the diffuser 312, the diffuser openings 314 and the screen 324.

Upon actuation of the initiators 248 and/or 258, the heat and/or gas produced by the reacting generant materials 284 and 304, in combination with the pressurized stored gas already in the pressurized stored gas-containing sealed chamber, increases the internal pressure of the pressurized stored gas-containing sealed chamber 226. The gas pressure in the pressurized stored gas-containing sealed chamber 226 ruptures the rupturable outlet seal 320, thereby allowing the pressurized stored gas and the gas produced by the reacting generant material to pass through the nozzle passage 316 and the screen 324 to discharge from the diffuser 312 through the diffuser openings 314 as inflation gas for inflating an associated inflatable cushion (not shown).

The first and second initiators 248 and 258 can be actuated individually, simultaneously or in sequence at a predetermined time interval. As discussed above, output parameters such as one or more of the quantity, supply and rate of production of inflation gas, for example, can be selectively and appropriately varied by various and alternative initiator actuation sequences. In one particularly preferred embodiment of the invention, the first initiator 248 is actuated by a first electric signal at a predetermined time interval before the second initiator 258. Upon actuation, the first initiator 248 produces an ignition discharge that ruptures the first initiator seal 286 and initiates reaction of the booster 310. The booster 310 reacts to desirably produce heat and/or gas to generally rapidly increase the pressure within the pressurized stored gas-containing sealed chamber 226 and also act with the ignition discharge to initiate reaction of the first supply of generant material 284. The first supply of generant material 284 reacts to produce at least one of heat and a gas, which is released into the chamber 226 through the openings 276. The increase in pressure within the pressurized stored gas-containing sealed chamber 226 ruptures the outlet seal 320 and inflation gas discharges through the diffuser openings 314. The second initiator 258 is actuated by a second electric signal at a predetermined time interval after the first initiator 248. The second initiator 258 may be actuated before or after the outlet seal 320 ruptures. The second initiator 258 produces an ignition discharge that ruptures the second initiator seal 306 and initiates reaction of the second supply of generant material 304. The second supply of generant material 304 reacts to produce additional heat and/or gas. The produced gas discharges from the chamber 226 through the diffuser openings 314. The inflator device 220 is thus capable of providing an adaptive output of inflation gas with a first initial stage of inflation gas production provided by the actuation of the first initiator 248 before the second stage of inflation gas production by the subsequent actuation of the second initiator 258.

Thus, the invention provides a hybrid inflator device of relatively low cost, lightweight design. Disposing the generant housing(s) containing the generant material within the pressurized stored gas-containing sealed chamber allows for a relatively simplistic design for the generant material reaction chamber(s), e.g., perforated metal rolled and welded to form a perforated tube, while obviating the need for an additional and separate hermetically sealed chamber to house the generant material. The relatively low cost, lightweight perforated tubes of the invention meet or exceed structural requirements. The perforated tubes also act as a filter to contain residue from the reacting generant material, thereby eliminating the need for an additional filter commonly used in currently available inflator devices. In addition, by storing the generant material within the pressurized stored gas-containing sealed chamber, the inflator device provides improved reaction initiation of the generant material, thereby providing improved inflation gas production and reducing or eliminating the need for known secondary ignition systems.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflator device for an inflatable restraint system, the inflator device comprising:
   a substantially cylindrical housing defining a chamber, the housing comprising:
   a tubular body including a center portion of reduced diameter and a center discharge opening disposed in the center portion of reduced diameter;
   a first end closure at a first end of the tubular body;
   a second end closure at a second end of the tubular body opposite the first end, wherein the chamber is a sealed chamber;
   a supply of pressurized stored gas disposed within the sealed chamber;
   the first end closure securing a first initiator in reaction initiating communication with a first supply of generant material disposed within the sealed chamber and in contact with the supply of pressurized stored gas;
   the second end closure securing a second initiator in reaction initiating communication with a second supply of generant material disposed within the sealed chamber and in contact with the supply of pressurized stored gas;
   a first rupturable initiator seal disposed between the first initiator and the first supply of generant material and a second rupturable initiator seal disposed between the second initiator and the second supply of generant material;
   a first generant housing joined to the first end closure, the first generant housing defining a first generant chamber containing the first supply of generant material, the first generant housing including a plurality of openings providing fluid communication between the first generant chamber and the sealed chamber, the first generant housing comprising a first perforated tube;
   a second generant housing joined to the second end closure, the second generant housing defining a second generant chamber containing the second supply of generant material, the second generant housing including a plurality of openings providing fluid communication between the second generant chamber and the sealed chamber, the second generant housing comprising a second perforated tube; and
   a diffuser connected to the tubular body portion of reduced diameter in discharge communication with the center discharge opening.

2. The inflator device according to claim 1 wherein a rupturable outlet seal seals the center discharge opening, and upon reaction initiation of the supply of generant material the rupturable outlet seal ruptures and inflation gas discharges from the chamber through the diffuser.

3. The inflator device according to claim 2 wherein at least one of the first rupturable initiator seal, the second rupturable initiator seal and the rupturable outlet seal comprises a rupturable foil disk.

4. The inflator device according to claim 1 wherein the inflatable restraint system is a passenger side inflatable restraint system.

5. The inflator device according to claim 1 wherein, upon reaction initiation, the first supply of generant material disposed in the first generant chamber reacts to produce at least heat, inflation gas and a residue material, and at least a portion of the residue material is retained within the first generant chamber by the first perforated tube.

6. An inflator device for an inflatable restraint system, the inflator device comprising:
- a tubular body including a first end, a second end opposite the first end, a center portion of reduced diameter, and a center discharge opening disposed in the center portion of reduced diameter;
- a first end closure joined to the first end of the tubular body, the first end closure securing a first initiator;
- a second end closure joined to the second end of the tubular body, the second end closure securing a second initiator;
- the tubular body and the first and second end closures defining a sealed chamber;
- a first generant housing disposed within the sealed chamber and defining a first generant chamber, the first generant housing comprising:
  - a first perforated tube connected at an open end to the first end closure and including a plurality of openings providing fluid communication between the first generant chamber and the sealed chamber; and
  - an end wall at an end of first generant chamber opposite the open end;
- a second generant housing disposed within the sealed chamber and defining a second generant chamber, the second generant housing comprising:
  - a second perforated tube connected at an open end to the second end closure and including a plurality of openings providing fluid communication between the second generant chamber and the sealed chamber; and an end wall at an end of second generant chamber opposite the open end;
  - a first rupturable initiator seal disposed between the first initiator and the first generant chamber;
  - a second rupturable initiator seal disposed between the second initiator and the second generant chamber;
  - a rupturable outlet seal disposed over the center discharge opening;
  - a supply of pressurized stored gas disposed within the sealed chamber;
  - a first supply of generant material disposed within the first generant chamber; and
  - a second supply of generant material disposed within the second generant chamber.

7. The inflator device according to claim 6 wherein at least one of the first rupturable initiator seal, the second rupturable initiator seal and the rupturable outlet seal comprises a rupturable foil disk.

8. The inflator device according to claim 6 wherein the inflatable restraint system is a passenger side inflatable restraint system.

9. The inflator device according to claim 6 wherein, upon reaction initiation, at least the first supply of generant material disposed in the first generant chamber reacts to produce at least heat, inflation gas and a residue material, and at least a portion of the residue material is retained within the first generant chamber by the first perforated tube.

* * * * *